J. DUQUETTE.
HOOK AND EYE.
APPLICATION FILED MAY 11, 1912.
1,071,404.
Patented Aug. 26, 1913.
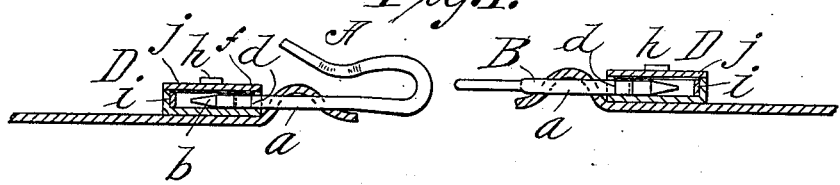
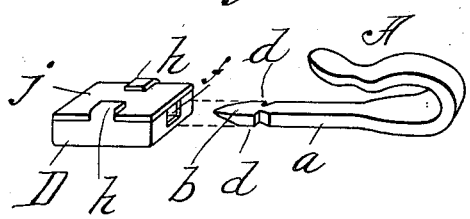
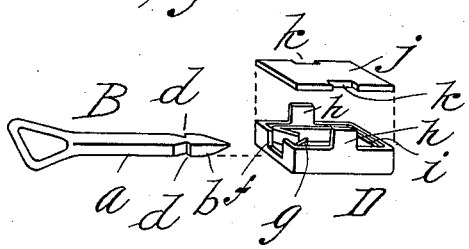
WITNESSES:
H. L. Sprague
W. P. Noble.
INVENTOR,
Jennie Duquette,
BY
ATTORNEY.

UNITED STATES PATENT OFFICE.

JENNIE DUQUETTE, OF CHICOPEE, MASSACHUSETTS.

HOOK AND EYE.

1,071,404.　　　　Specification of Letters Patent.　　Patented Aug. 26, 1913.

Application filed May 11, 1912. Serial No. 696,626.

*To all whom it may concern:*

Be it known that I, JENNIE DUQUETTE, a citizen of the United States of America, and resident of Chicopee, in the county of Hampden and State of Massachusetts, have invented certain new and useful Improvements in Hooks and Eyes, of which the following is a full, clear, and exact description.

The object of this invention is to provide hooks and eyes which are self attachable to the fabric or portions of garments on which they are to be used, that is to provide hooks and eyes which without the necessity of any sewing or stitching into the fabric are as well or even better and more reliably secured than if sewed on.

The invention is applicable alike to the hook member and to the eye member of a hook and eye and comprises a hook or eye member having a pointed fabric piercing shank and provided forward of the point with one or more shoulders, whereby the shank portion may pierce the fabric, the shoulders acting as barbs to prevent the withdrawal of the pointed shank from its engagement in the retainer.

The device, furthermore, includes means engageable with the shank to serve as a means for preventing the withdrawal of the shank from the fabric.

The invention is described in conjunction with the accompanying drawings and is set forth in the claim.

In the drawings:—Figure 1 is a side view and partial sectional view of hook and eye members represented as engaged through portions of cloth. Fig. 2 is a perspective view of the hook member and the device employed in conjunction therewith for preventing possible withdrawal, such parts being shown in separated relations. Fig. 3 is a perspective view showing the eye member and the retaining device engageable therewith, the top plate of the latter being shown as separated from the body for clearer illustration.

In the drawings,—A represents the hook member and B the eye member, each provided with a shank $a$ having a pointed end $b$ so that the shank may readily pierce the fabric in manner such as represented, for instance, in Fig. 1. The shank is recessed at opposite sides forward of the pointed end portion $b$ so as to form the abrupt or comparatively sharp shoulders $d$ $d$ which have the function of barbs so that after the insertion of the hook or eye shank into the retainer the same may not be readily withdrawn.

A retainer is employed which consists of a hollow casing D having an aperture $f$ through its side for the entrance thereinto of the pointed and shouldered shank and having inwardly convergent spring tongues $g$ $g$ therein at opposite sides of the aperture for engagement with the shoulders $d$ $d$. The box-like and sidewise apertured casing has a pair of lips $h$ $h$ integral with opposite side walls thereof. In practice the convergent spring tongues $g$ $g$ are formed as the extremities of a thin flat spring metal strip $i$ bent to closely fit within the box-like casing. This arrangement of the spring provides for its reinforcement and retention in operative position with the casing without soldering or fastening means. The little casing has a cover plate $j$ for closing it, which plate has opposite edge recesses $k$ $k$ in which the aforementioned lips $h$ $h$ of the casing engage, while the extremities of such lips are downturned on said plate for securing it to the casing.

The retaining devices D such as described are easily and rapidly made, of very small size,—the drawings here provided being several times magnified,—and once the retainer is snapped to engagement with the shouldered shank of the hook or eye member, it permanently retains its engagement and is not separable from the shank, nor will the hook and eye member be disengaged from the fabric without the destruction of the one or the other.

I claim:—

An article of manufacture consisting of a box-like case having a hook receiving opening through one side thereof, a U-shaped spring of flat ribbon metal disposed in contacting relation with the inner face of the wall of said case, and having its terminal portions bent inwardly in converging relation adjacent said hook receiving opening to form spring hook latching tongues and having its upper edge substantially in alinement with the edge of the case wall, said spring being co-extensive with the major portion of said wall and serving to reinforce the same against being crushed, and a cover secured to the case and interlocked against the upper edge of said case wall against displacement thereon.

Signed by me at Springfield, Mass., in presence of two subscribing witnesses.

JENNIE DUQUETTE.

Witnesses:
 Wm. S. Bellows,
 G. R. Driscoll.

Copies of this patent may be obtained for five cents each, by addressing the "Commissioner of Patents, Washington, D. C."